United States Patent [19]

Yoshitake et al.

[11] Patent Number: 4,903,325

[45] Date of Patent: Feb. 20, 1990

[54] PORTABLE WIRELESS COMMUNICATION APPARATUS

[75] Inventors: Kunitoshi Yoshitake; Yoshihiro Tsujita; Hideyo Ono, all of Hyogo, Japan

[73] Assignee: Mitsubishi Denki Kabushiki Kaisha, Tokyo, Japan

[21] Appl. No.: 213,494

[22] Filed: Jun. 30, 1988

[30] Foreign Application Priority Data

Jun. 30, 1987 [JP] Japan ............................ 62-164763

[51] Int. Cl.⁴ .............................................. H04B 1/38
[52] U.S. Cl. ........................................ 455/89; 455/90; 455/127; 455/343
[58] Field of Search ...................... 455/89, 90, 27, 128, 455/117, 343, 345, 346–349; 379/58, 61, 420, 433; 361/422; 320/2

[56] References Cited

U.S. PATENT DOCUMENTS

| | | | |
|---|---|---|---|
| 4,122,304 | 10/1978 | Mallien, II ............................ | 455/90 |
| 4,199,204 | 4/1980 | Hodsdon et al. ...................... | 455/90 |
| 4,558,270 | 12/1985 | Liautaud et al. ...................... | 455/90 |
| 4,636,741 | 1/1987 | Mitzlaff ................................ | 455/127 |
| 4,673,861 | 6/1987 | Dubovsky et al. .................... | 455/89 |
| 4,709,201 | 11/1987 | Schaefer et al. ...................... | 455/89 |

FOREIGN PATENT DOCUMENTS 61-1122  1/1986  Japan .

*Primary Examiner*—Robert L. Griffin
*Assistant Examiner*—Curtis A. Kuntz
*Attorney, Agent, or Firm*—Lowe, Price, LeBlanc, Becker & Shur

[57] ABSTRACT

A portable wireless communication apparatus of new type is provided. The apparatus is composed of a handset type substantially parallelopiped body which is to be used in combination with a battery pack in a portable mode and a support tray installed in a passenger car room for hand-free use. The top surface of the body is provided with a key operating section, a display section and a speaker. All of them are in the user's sight while the apparatus is being used in the hand-free mode. In the portable mode, on the other hand, all the user has to do is only take up the apparatus away from the tray after the key board operation, hold the receiving section against the ear and talk into the transmitting section without changing the grip.

14 Claims, 5 Drawing Sheets

PORTABLE WIRELESS COMMUNICATION APPARATUS

BACKGROUND OF THE INVENTION

1. Field of the Invention

The present invention relates to the portable wireless communication apparatus with developed car-loadability as well as portability.

2. Description of the Prior Art

FIG. 6 shows an external perspective view of a typical and conventional portable communication apparatus, whereas FIG. 7 equally shows that of a typical combination portable and car-loadable wireless communication apparatus.

In FIG. 6, 5 denotes a portable wireless communication apparatus 5a a receiver section, and 5b a transmitter section. One user can communicate with another by holding the receiver section against his ear and talking into the transmitter section. 5c is a key operating section, and 5d is a display section. Said key operating section 5c and display section 5d are placed on the same surface as the transmitter section 5b and the receiver section 5a. A battery pack 6 is provided on the opposite side to that on which the transmitter 5b section and the receiver section 5a are provided but it can be placed at one of the lateral faces. 7 denotes a collapsible antenna that can be stored inside the apparatus for portable convenience. On the longitudinal end surface, a connector is provided to enable various external connections such as to a car antenna, to the power supply for itself or for battery charge, and also to more devices to realize multifunctions.

However, in this structure above, although it is easily used as a portable device when used as a car-loadable type while the car is in motion, the key operation is not performed easily even with a support table used for storing the same. Furthermore, even if it is placed in such a way as easy key operation is given top priority, the user must change his grip to hold the receiver against his ear after picking up the device.

Also, although the calling buzzer is installed inside, when used for automotive use, an external speaker will be needed, since a speaker with enough sound pressure to enable the user to hear it is not provided. Besides, the user must pick up the whole device with a heavy battery installed inside.

In FIG. 7, 8 denotes a main body of the conventional transmitter-receiver that has a built-in battery with a hand set storing portion on its upper surface. 9 is a hand set and contains a receiver section 9a and a transmitter section 9b on its bottom surface, while a key operating section 9c, a display section 9d, and a speaker 9e are arranged on the top surface.

If the transmitter-receiver 8 is fixed inside a passenger room with fittings 10 in the above state, the user has only to answer the call by picking up the light hand set 9 instead of the whole transmitter-receiver 8 with a heavy built-in battery. Besides, as a big speaker 9e is stored in the hand set 9, the calling sound is fairly large, and therefore an external speaker is not necessary when a hand-free microphone is used. However, since the transmitter-receiver 8 and the hand set 9 are separate members, the resulting system is bulky and less portable.

As described above, in the conventional portable or combination portable and car-loadable wireless communication apparatus, when the portable type is used as a car-loadable type, there are various difficult points such as; (1) a good location for key operation is not available, (2) the grip will not provide the feel of a hand set, so that the apparatus is consequently difficult to use, (3) the calling sound is so small that an external speaker is required in the hand-free mode. On the other hand, the combination portable and car-loadable type has, when used as a portable type, also other problems such as: a coiled cord is needed as the hand set is separately arranged, and also portability, mobility and fashionability of the whole apparatus are much reduced as the whole set must be enlarged.

There has been a remarkable development in the modern technology in miniaturization and weight reduction of the wireless communication apparatus, and making the maximum use of it, various portable wireless communication apparatuses have been made by now. However, this kind of miniaturized portable apparatus was still a far cry from a hand set of the conventional car-loadable type in the lightness, size, and operationability. There are some reasons for this: (1) technical development for a battery part of the portable type is relatively slow as compared to other electronic devices, and therefore its weight cannot be reduced, (2) portability, fashionability as a portable type and operationability as a car-loadable type have not been realized simultaneously.

The present invention has been accomplished so as to solve the above problems, enabling its use as a car-loadable type and hand set like operation, providing an ample sound pressure when used with a hand-free microphone, aiming at a portable wireless communication apparatus that minimizes the reduction of portability, mobility and fashionability required in a car-loadable type.

SUMMARY OF THE INVENTION

The inventive portable wireless communication apparatus comprises a substantially rectangular parallelopiped body having a top surface and a bottom surface wherein said top surface is provided with a key operating section, a display section and a speaker whereas said bottom surface is provided with a transmitter section and a receiver section; a collapsible antenna and a connector mounted to respective longitudinal end surfaces of said body; said bottom surface of the body having a battery pack seat between said transmitter section and said receiver section; a battery pack removably attached to said battery pack seat; and said battery pack seat with said battery pack removed being rested on a support tray installed in an automobile passenger room and powered therefrom.

When the portable communication apparatus according to this invention is used as a car-loadable type, as it is made more like a hand-set by removing the heavy big battery from between the transmitter section and the receiver section and placing its installing surface on a support tray, its portability, mobility and fashionability can be remarkably increased by being used exactly as a hand set. Also, since the above hand-set like device is provided with a speaker and a key operating section on the opposite surface of the transmitter section and the receiver section, when used in the hand-free mode, the external speaker is unnecessary, and easy key operation is made possible.

BRIEF DESCRIPTION OF THE DRAWINGS

FIG. 3 is an exploded view of the above embodiment while

FIG. 6 is a perspective view showing a conventional portable wireless communication apparatus whereas

DETAILED DESCRIPTION OF THE EMBODIMENT

Figure 1:
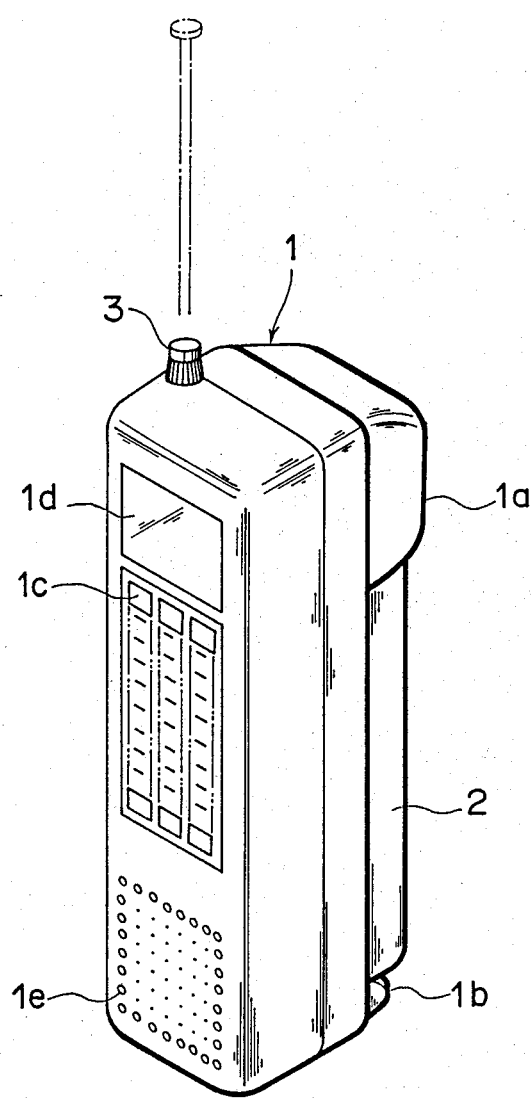
FIGS. 1 and 2 are perspective views of one embodiment of the present invention showing the state in which it is set for portable use.
Figure 2:
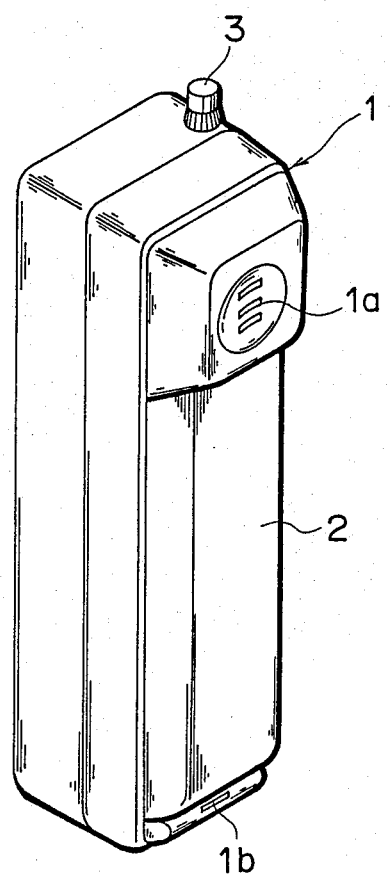
Figure 3:
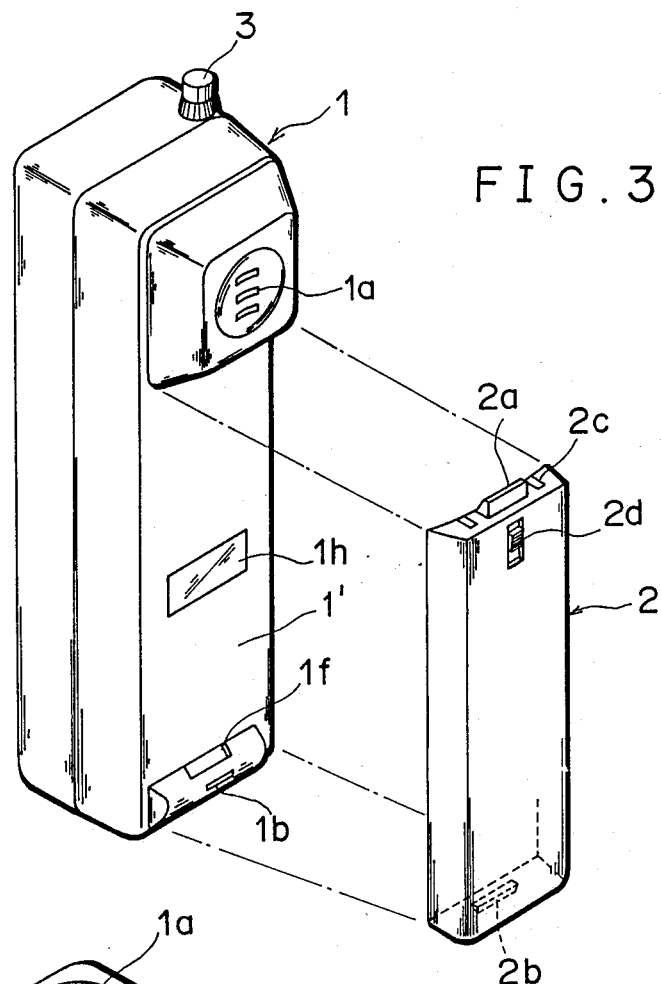
Figure 4:
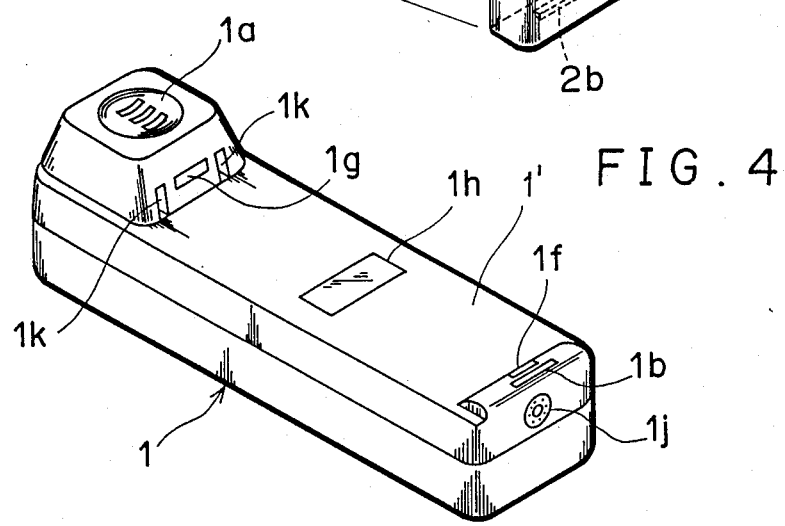
FIG. 4 shows the same embodiment with a battery pack removed from the apparatus.
Figure 5:
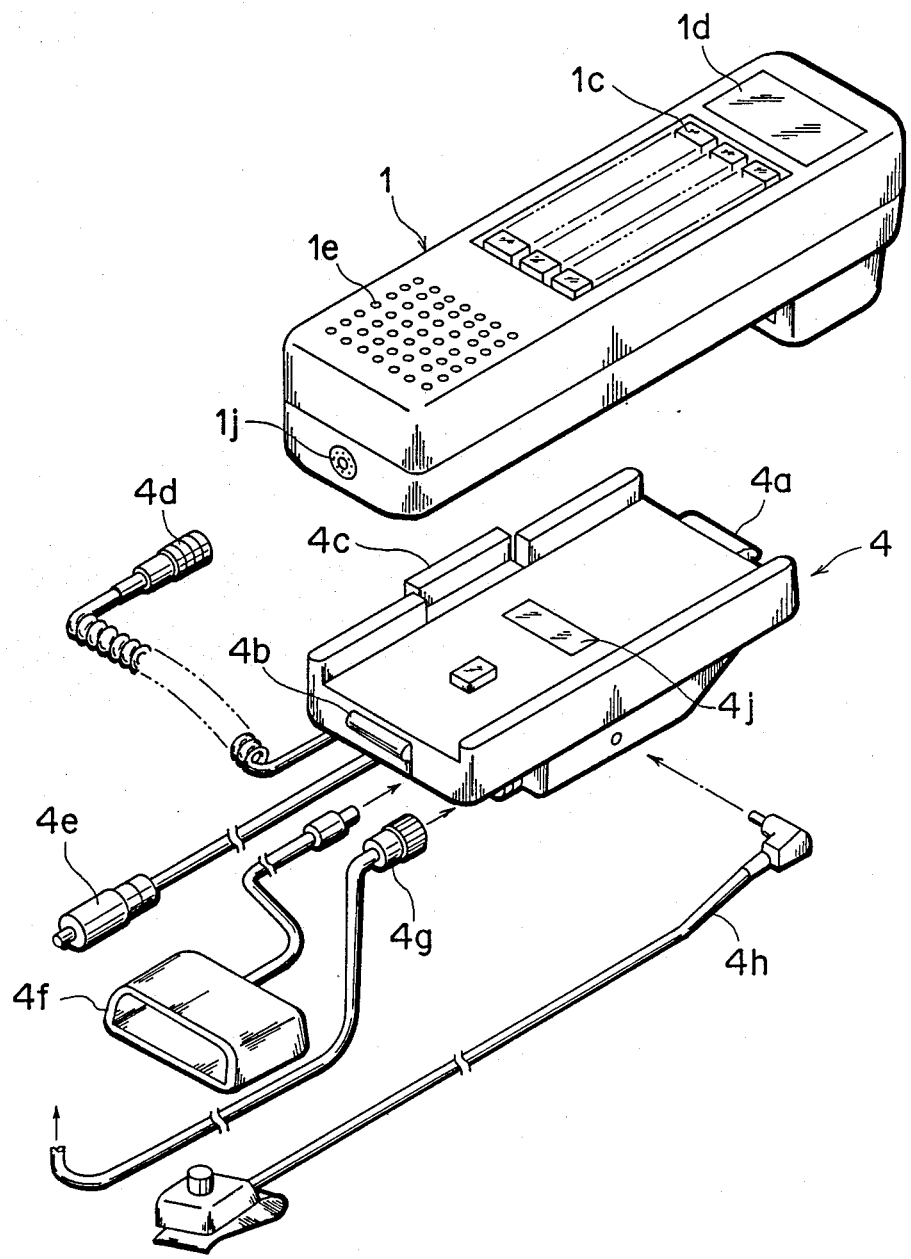
FIG. 5 is another exploded view of the same embodiment when used in combination with a support table installed in a passenger car room.
Figure 6:
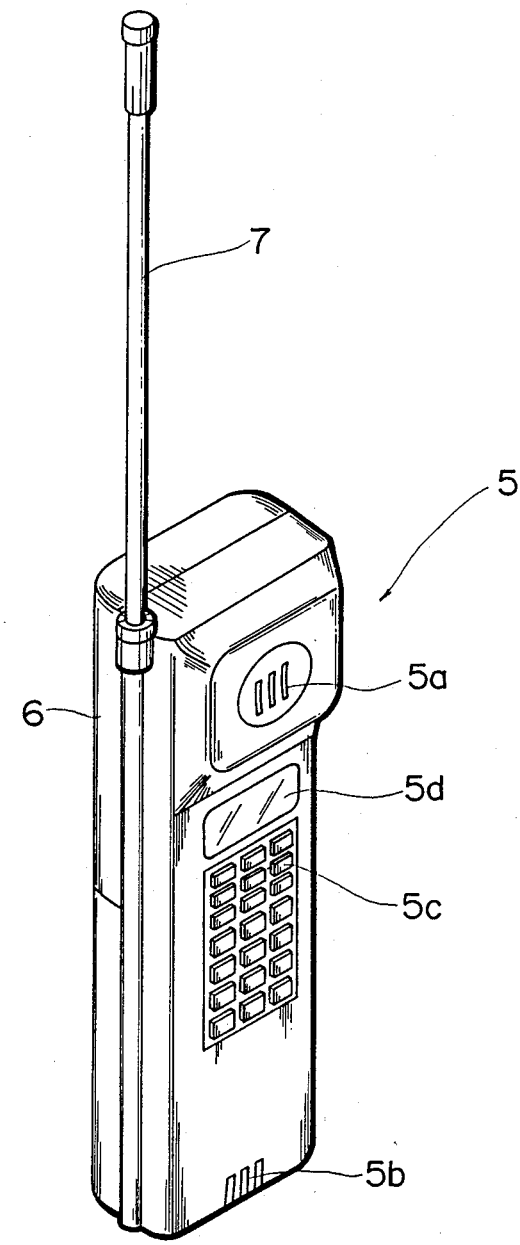
Figure 7:
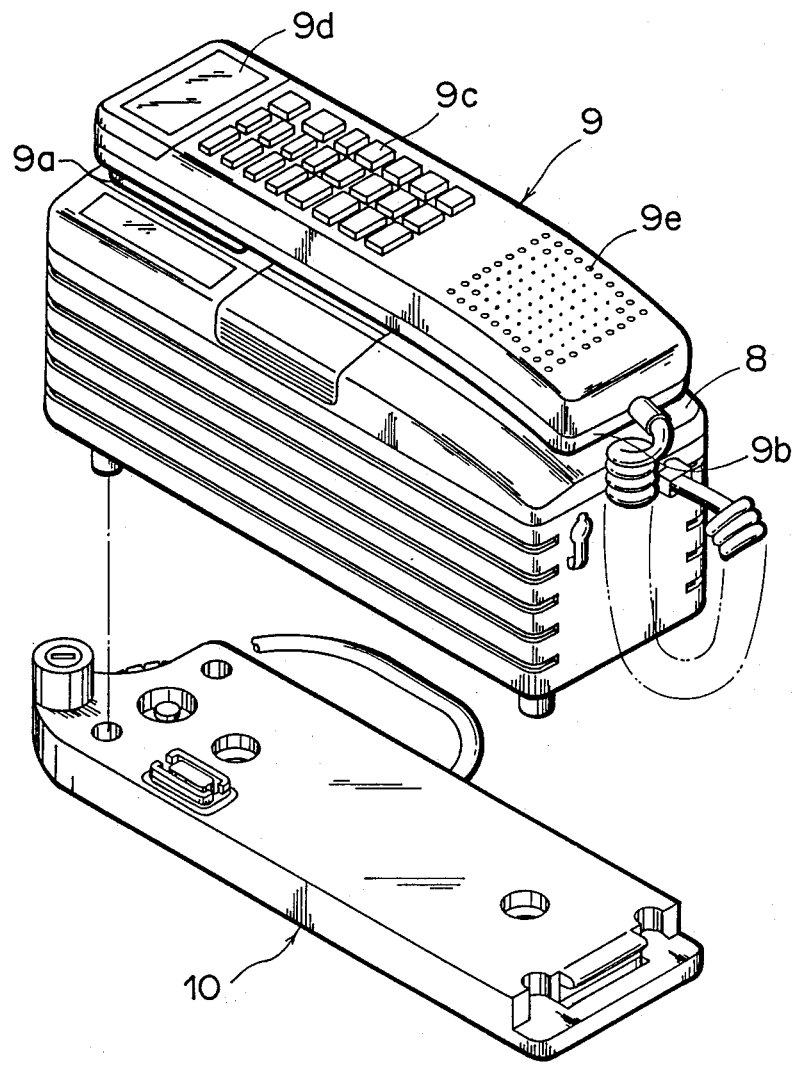
FIG. 7 shows another perspective view of said conventional apparatus when used in combination with a support tray installed in an automobile passenger room.

Referring to FIGS. 1 and 2, 1 denotes a portable wireless communication apparatus, 2 denotes a battery pack, and 3 a portable antenna. 1a is a receiver section and 1b a transmitter section. Said apparatus can be used in the same way as a hand set of the telephone. 1c is a key operating section, 1d is a display section using LCD, 1e is a speaker to set off the calling sound or loud sound output in the hand-free state. In FIGS. 3 and 4, there is provided battery pack seat 1' between said receiver section 1a and transmitter section 1b to receive said battery pack 2 thereon. 1f and 1g are engagement slits, while 1h is a reserved space for external connector 1j which is a composite connector with a coaxial connector therein. 1k is a battery pack connecting terminal to be connected to the battery pack 2 installed. 2a is a retractable projection, 2b is a fixed projection. 2c is a battery terminal, and 2d is a battery release lever. The battery pack 2 is one-touch fitted on the battery pack seat 1' only by pushing it through the function of the retractable projection 2a whereas it is released merely by pressing down the release lever. In FIG. 5, 4 is a support tray onto which the portable wireless communication apparatus 1 is fixed when it is used as a car-loadable type, and is designed for the portable wireless communication apparatus 1 to be used easily together with its accessories. 4a is a fixed projection, 4b is a retractable projection, 4c is a release lever, and the retractable projection 4b is activated by the release lever 4c, facilitating the installation or removal of the portable wireless communication apparatus 1. As a matter of fact, the fixed projection 4a and the retractable projection 4b are engaged with the slits 1f and 1g respectively. 4d is a connector with a coiled cord, and apart from the coaxial connector it includes the necessary number of cores to be connected to other external devices. Also 4d being of a bayonet type, one-touch connection to or disconnection from the portable wireless communication apparatus 1 is performed easily, and the cord being coiled, the portable wireless communication apparatus 1 can be used very easily even when it is used in a car. 4e is a cigar lighter plug to get electric power from the power supply of a car, and 4f is a charging adaptor for charging the battery pack, 4g is a connector to be connected to a car antenna and 4h is a hand-free microphone. Each of said members being connected through the attachment base. 4j is a reserved space for arranging the external connector, and it corresponds to 1h of the portable wireless communication apparatus side, and can be a utility space for multi-functions.

The above structured portable wireless communication apparatus facilitates installation and release of the battery pack 2 located between the transmitter section 1a and the receiver section 1b, and when it is used as a car-loadable type, as it can be placed on the support tray 4 instead of the battery pack 1, it can be used exactly as a hand set, raising portability, mobility and fashionability of the car-loadable apparatus as a whole.

Also, when it is placed on the support tray 4, as the operating section 1c, the display section 1d, and the speaker 1e of the portable communication apparatus are facing upwards, key operation and reading of the display part can be easily performed, and also as the calling sound from the speaker 1e and the voice from the receiver section are substantially enhanced, consequently, the external speaker is not required when used in the hand-free mode. In the same way, if the user desires to use it just like a hand set device, (in other words, if the user does not want his conversation to be heard by anybody else), he has only to push the release lever 4c and lift up the portable wireless communication apparatus with coiled cord and connector 4d.

Connection to an external device necessary in this situation; i.g. connections to a car antenna, to the car battery whose capacity is substantially large, and to an external microphone to give the hand-free function, are performed all though the connector with the coiled cord 4d, so that it does not hamper a hand use and that the operationability is substantially raised. The battery pack 2 is a heavy object, and it requires energy supply by charging it. Since short-time energy supply is required more often nowadays, the charge by the adaptor 4f seems to be ideal. The fact that the key operating section 1c and the speaker 1e do not disturb when the portable communication apparatus 1 is held by a user's hand has already been proved by the cellular type car-telephone throughout the world. Besides, when it is used as a portable type, as the connector reserving space 1h or 4j is placed on the surface hidden by the battery pack 2, it can be easily adapted to the multifunctions to be realized in the near future.

By the way, in the above embodiment, the main part of the support tray 4 has a function of connecting it to an external device, but it is not strictly regulated. Furthermore, fixing of the battery pack 2 to the portable communication device 1 or its release therefrom, or fixing of the portable communication apparatus 1 to the support base or its release therefrom does not necessarily follow the above embodiment. For example, the connector reserving space 1h and 4j can be shared for this purpose.

As above, the portable communication apparatus according to this invention has the battery pack between the receiver section and the transmitter section on one side, with the key operating section, display section and the speaker on the other side, enabling its use as a car-loadable type by placing the battery pack side on the support tray, so that it can be used just like a hand set that is indispensable when it is used as a car-loadable type without marring the portability, mobility and fashionability, and that an external speaker is unnecessary.

What is claimed is:

1. A portable wireless communication apparatus comprising a substantially rectangular parallelopiped body having a top surface and a bottom surface wherein said top surface is provided with a key operating section, a display section and a speaker, whereas said bottom surface is provided with a transmitter section and a receiver section;

a collapsible antenna and a connector mounted to perspective longitudinal end surfaces of said body;

said bottom surface of the body having a battery pack seat between said transmitter section and said receiver section;

a battery pack removably attached to said battery pack seat; and said battery pack seat being structured to engage an automobile passenger compartment support table when not attached to said battery pack and being powered from said support table.

2. A portable wireless communication apparatus according to claim 1, wherein said receiver section rises from said bottom surface to protrude beyond the attached battery pack.

3. A portable wireless communication apparatus according to claim 1, wherein said support table has a support surface for releasably engaging said battery pack seat of said body.

4. A portable wireless communication apparatus comprising:

a substantially rectangular parallelopiped body having a top surface annd a bottom surface wherein said top surface is provided with a key operation section, a display section and a speaker for hand-free communication, and said bottom surface is provided with a transmitter section and a receiver section at opposite ends thereof and a battery pack seat positioned therebetween;

a collapsible antenna and a connector provided in respective longitudinal end surfaces of said parallelopiped body;

a battery pack releasably attached to said battery pack seat;

said parallelopiped body connected to a support table, said support table mounted in a vehicle, said support table further connectable to a plurality of devices including a power supply of the vehicle, an external antenna of the vehicle and an external hand-free microphone, whereby said portable wireless communication apparatus is operable as a vehicle-mounting type communication apparatus acquiring electric power from said vehicle and automatically switching from said collapsible antenna thereof to said external antenna.

5. A portable wireless communication apparatus as claimed in claim 4, wherein said parallelopiped body thereof and said support table are connected through a curl cord.

6. A portable wireless communication apparatus as claimed in claim 4, wherein said receiver section rises from said bottom surface in such a manner that it protrudes beyond said attached battery pack.

7. A portable wireless communication apparatus as claimed in claim 4, wherein said support table is further connected with a battery charging adaptor for charging said battery pack.

8. A portable wireless communication apparatus as claimed in claim 4, wherein said support table is connected to said power supply, to said-external antenna and to said external hand-free microphone thereby to operate as a vehicle-mounted communication apparatus receiving electric power from said power supply of the vehicle and automatically switching from said collapsible antenna thereof to said external antenna of the vehicle.

9. A portable wireless communication apparatus as claimed in claim 4, wherein said parallelopiped body further includes release means for releasably engaging said battery pack.

10. A portable wireless communication apparatus as claimed in claim 9, wherein said release means comprises a slit-and-projection arrangement on said parallelopiped body and on said battery pack, together with a release lever for retracting said projection thereby to release said battery pack.

11. A portable wireless communication apparatus as claimed in claim 10, wherein one of a slit and a projection is provided on said parallelopiped body and the other of said slit and said projection is provided on said battery pack; and wherein said support table also includes the other of said slit and said projection, and wherein said release laver is provided for withdrawing said projection thereby to engage and release said battery pack to said battery pack seat and to engage and release said support table from said battery pack seat.

12. A portable wireless communication apparatus as claimed in claim 4, further including vehicle antenna connecting means for connecting said support table to said external antenna of the vehicle and wherein said parallelopiped body and said support table are connected by further connecting means including therein means for connecting the parallelopiped body through said support table to said external antenna of the vehicle.

13. A portable wireless communication apparatus comprising:

a substantially rectangular parallelopiped body having a top surface and a bottom surface wherein said top surface is provided with a key operating section, a display section and a speaker for hand-free communication, and said bottom surface is provided with a transmitter section and a receiver section at opposite ends thereof and a battery pack seat positioned therebetween;

a collapsible antenna and a connector provided in respective longitudinal end surfaces of said parallelopiped body;

a battery pack releasably attached to said battery pack seat;

said parallelopiped body connected to a support table, said support table mounted in a vehicle, said support table further connectable to a plurality of devices including a power supply of the vehicle, an external antenna of the vehicle and an external hand-free microphone, whereby said portable wireless communication apparatus is operable as a vehicle-mounting type communication apparatus acquiring electric power from said vehicle and automatically switching from said collapsible antenna thereof to said external antenna;

wherein said support table further includes means for accepting said battery pack seat.

14. A portable wireless communication apparatus as claimed in claim 13, wherein said parallelopiped body thereof and said support table for accepting said battery pack seat are connected through a curl cord.

* * * * *